United States Patent
Vassilovski et al.

(10) Patent No.: US 12,240,485 B2
(45) Date of Patent: Mar. 4, 2025

(54) AUTONOMOUS DRIVING NETWORK VEHICLE ALERTING

(71) Applicant: QUALCOMM Incorporated, San Diego, CA (US)

(72) Inventors: Dan Vassilovski, Del Mar, CA (US); Gavin Bernard Horn, La Jolla, CA (US); Gene Wesley Marsh, San Diego, CA (US); Hong Cheng, Basking Ridge, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 527 days.

(21) Appl. No.: 17/451,571

(22) Filed: Oct. 20, 2021

(65) Prior Publication Data

US 2023/0122124 A1    Apr. 20, 2023

(51) Int. Cl.
*B60W 60/00* (2020.01)
*H04W 4/40* (2018.01)

(52) U.S. Cl.
CPC ............ *B60W 60/001* (2020.02); *H04W 4/40* (2018.02); *B60W 2556/45* (2020.02)

(58) Field of Classification Search
CPC ... H04W 72/1263; H04W 72/20; H04W 4/40; B60W 60/001; G08G 1/165
USPC ......................................................... 701/26
See application file for complete search history.

(56) References Cited

U.S. PATENT DOCUMENTS

| | | | |
|---|---|---|---|
| 2017/0269593 A1* | 9/2017 | Letwin .............. | B60W 60/0059 |
| 2019/0389482 A1* | 12/2019 | Michalakis ......... | B60W 50/085 |
| 2021/0046946 A1* | 2/2021 | Nemec ................. | G05D 1/0061 |
| 2022/0126820 A1* | 4/2022 | Fields ............... | B60W 60/0059 |
| 2022/0141426 A1* | 5/2022 | Kim ...................... | G06V 20/56 |
| | | | 348/148 |
| 2022/0295337 A1* | 9/2022 | Kim ..................... | H04W 76/14 |

OTHER PUBLICATIONS

Machine Translation of KR1020200145604, filed on Nov. 3, 2020, 62 pages.
Machine Translation of KR1020200145854, filed on Nov. 4, 2020, 99 pages.

* cited by examiner

*Primary Examiner* — Todd Melton
*Assistant Examiner* — Vincent Feng
(74) *Attorney, Agent, or Firm* — Qualcomm/Norton Rose Fulbright US LLP

(57) ABSTRACT

This disclosure provides systems, methods, and devices for wireless communication that support vehicle alerting, such as in autonomous driving networks. Vehicle alerting may provide messages alerting other vehicles and/or network components to instances of autonomous driving disengagement. A vehicle operating according to an autonomous vehicle (AV) mode may transmit an over-the-air message to one or more other devices, such as nodes of an autonomous driving network, to alert the one or more devices to the vehicle disengaging the AV mode. A device receiving an autonomous disengagement message may alter one or more autonomous operation aspects in response to the over-the-air message. Other aspects and features are also claimed and described.

30 Claims, 11 Drawing Sheets

```
600

AVDisengagementMessage ::= SEQUENCE {
   [Message Header Fields],
   disengagementCause      DisengagementCause OPTIONAL,
   disengageLocation       DisengageLocation OPTIONAL,
   objCount                DetectedObjectCount OPTIONAL,
   objects                 DetectedObjectList OPTIONAL,
   DisengageLocation       Position3D OPTIONAL,
}
```

FIG. 6A

```
DisengagementCause ::= ENUMERATED{
   Unknown (0),
   Perception issue (1),
   Inclement weather (2),
   Collision hazard (3),
   ..
}
```

FIG. 6B

```
DetectedObjectList::= SEQUENCE (SIZE(1..256)) OF DetectedObjectData
DetectedObjectData::= SEQUENCE {
   detObjCommon   DetectedObjectCommonData,
   detVeh         DetectedVehicleData OPTIONAL,
   detVRU         DetectedVRUData OPTIONAL,
   detObst        DetectedObstacleData OPTIONAL
}
```

FIG. 6C

AUTONOMOUS DRIVING NETWORK VEHICLE ALERTING

TECHNICAL FIELD

Aspects of the present disclosure relate generally to wireless communication systems, and more particularly, to providing messages for alerting vehicles. Some features may enable and provide improved communications including vehicle alerting, such as to provide messages alerting other vehicles and/or network components to instances of autonomous driving disengagement.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station. A base station may transmit data and control information on a downlink to a UE or may receive data and control information on an uplink from the UE.

Development of autonomous driving capabilities for vehicles is an ongoing, world-wide effort spanning industry and academia. Vehicles incorporating autonomous driving capabilities employ sophisticated processor-based systems, sensors, and other advanced electronic technology. Such vehicles often implement wireless communication apparatus, such as for receiving updates to autonomous driving algorithms, route information, etc. Accordingly, the UEs of a wireless communication network may include instances of autonomous vehicles (AVs) and/or vehicles operating according to some form of AV mode.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is provided. The method may include identifying an instance of an autonomous driving disengagement by a vehicle operating according to an autonomous vehicle (AV) mode. The method may also include transmitting an over-the-air message from the vehicle. The over-the-air message may provide an indication of the autonomous driving disengagement.

In an additional aspect of the disclosure, an apparatus configured for wireless communication is provided. The apparatus includes at least one processor and a memory coupled to the at least one processor. The at least one processor may be configured to identify an instance of an autonomous driving disengagement by a vehicle operating according to an AV mode. The apparatus may also be configured to transmit an over-the-air message from the vehicle. The over-the-air message may provide an indication of the autonomous driving disengagement.

In an additional aspect of the disclosure, an apparatus configured for wireless communication is provided. The apparatus may include means for identifying an instance of an autonomous driving disengagement by a vehicle operating according to an AV mode. The apparatus may also include means for transmitting an over-the-air message from the vehicle. The over-the-air message may provide an indication of the autonomous driving disengagement.

In an additional aspect of the disclosure, a non-transitory computer-readable medium stores instructions for wireless communication is provided. The instructions, when executed by a processor, cause the processor to perform operations. The operations may include identifying an instance of an autonomous driving disengagement by a vehicle operating according to an AV mode. The operations may also include transmitting an over-the-air message from the vehicle. The over-the-air message may provide an indication of the autonomous driving disengagement.

In one aspect of the disclosure, a method for wireless communication is provided. The method may include receiving an over-the-air message from a first vehicle operating according to an AV mode. The over-the-air message may provide an indication of an instance of autonomous driving disengagement by the first vehicle. The method may also include altering one or more autonomous operation aspects in response to the over-the-air message.

In an additional aspect of the disclosure, an apparatus configured for wireless communication is provided. The apparatus includes at least one processor and a memory coupled to the at least one processor. The at least one processor may be configured to receive an over-the-air message from a first vehicle operating according to an AV mode. The over-the-air message may provide an indication of an instance of autonomous driving disengagement by the first vehicle. The at least one processor may also be configured to alter one or more autonomous operation aspects in response to the over-the-air message.

In an additional aspect of the disclosure, an apparatus configured for wireless communication is provided. The apparatus may include means for receiving an over-the-air message from a first vehicle operating according to an AV mode. The over-the-air message may provide an indication of an instance of autonomous driving disengagement by the first vehicle. The apparatus may also include means for altering one or more autonomous operation aspects in response to the over-the-air message.

In an additional aspect of the disclosure, a non-transitory computer-readable medium stores instructions for wireless communication. The instructions, when executed by a processor, cause the processor to perform operations. The operations may include receiving an over-the-air message from a first vehicle operating according to an AV mode. The over-the-air message may provide an indication of an instance of autonomous driving disengagement by the first vehicle. The operations may also include altering one or more autonomous operation aspects in response to the over-the-air message.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6A is an example application-layer alert message structure according to one or more aspects.

FIG. 6B is an example of disengagement codes as may be utilized in the application-layer alert message structure of FIG. 6A according to one or more aspects.

FIG. 6C is an example of detected object codes as may be utilized in the application-layer alert message structure of FIG. 6A according to one or more aspects.

Like reference numbers and designations in the various drawings indicate like elements.

DETAILED DESCRIPTION

Figure 1:
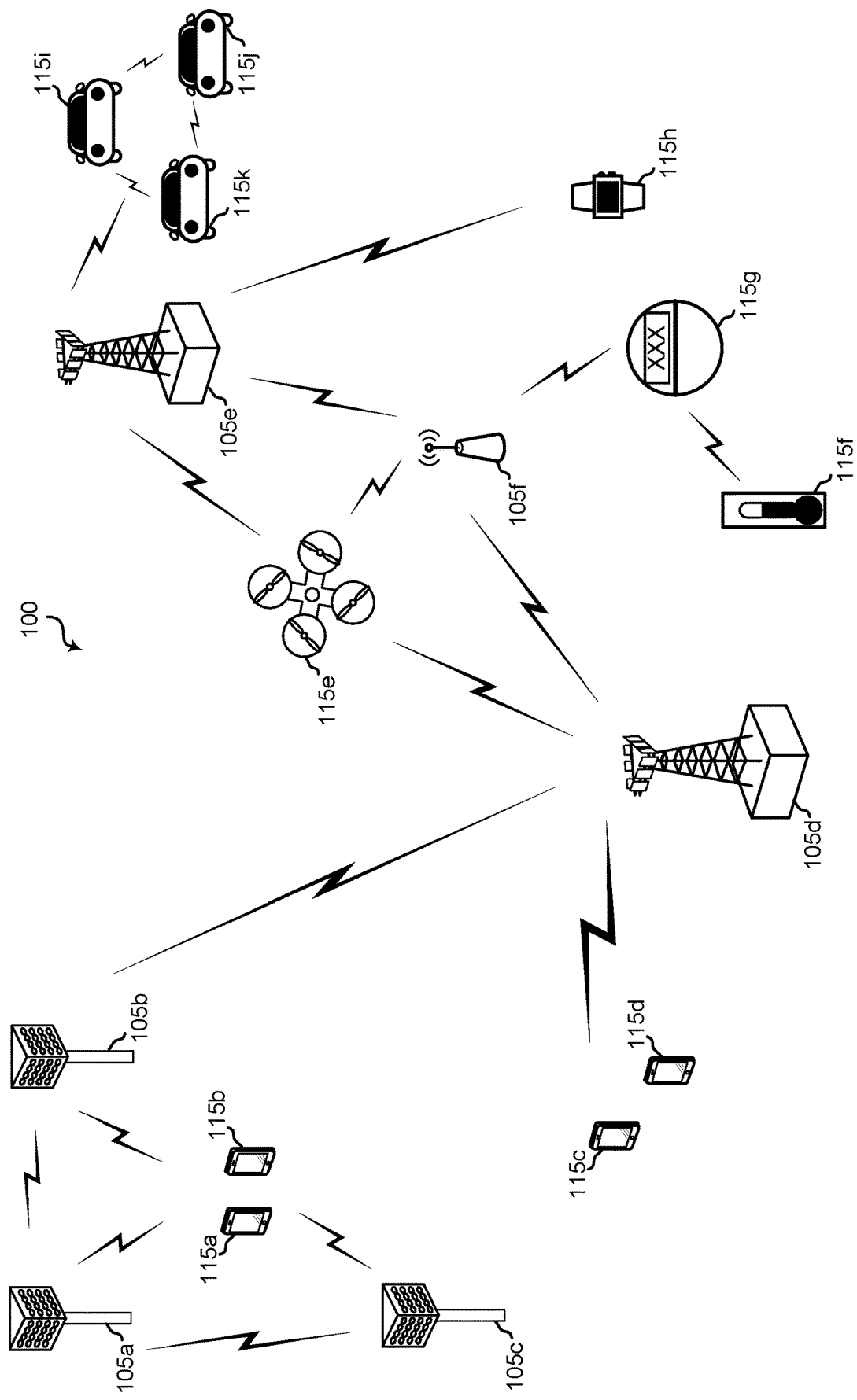
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support vehicle alerting in autonomous driving networks. Vehicle alerting according to some aspects of the present disclosure may provide messages alerting other vehicles and/or network components to instances of autonomous driving disengagement.

In accordance with some examples of the disclosure, a vehicle operating according to an autonomous vehicle (AV) mode (e.g., implementing autonomous driving operation) may transmit an over-the-air message to alert one or more other devices (e.g., base stations, AV management entities, other vehicles, roadside units (RSUs), etc.) to the vehicle disengaging, or having disengaged, the AV mode (e.g., autonomous driving disengagement, such as where an autonomous driving vehicle cedes control to a human driver). The foregoing various devices (e.g., a vehicle transmitting an autonomous driving disengagement message and base stations, AV management entities, other vehicles, RSUs, and other devices receiving the autonomous driving disengagement message) may, according to aspects of the disclosure, comprise nodes of an autonomous driving network. An autonomous driving network of some examples may comprise an ad hoc, dynamic set of devices (e.g., devices surrounding, nearby, adjacent, etc. a vehicle when the vehicle is transmitting an autonomous disengagement message) between which alert messaging is provided according to concepts of the present disclosure. Additionally or alternatively, one or more devices (e.g., AV management entities) comprising nodes of an autonomous driving network may have an a priori association with one or more autonomous driving networks.

In operation according to some aspects, alerting logic of a vehicle having AV capability may identify an instance of autonomous driving disengagement by the vehicle operating according to an AV mode and transmit an over-the-air message from the vehicle. The over-the-air message of some examples of the disclosure may provide an indication of the autonomous driving disengagement.

According to some examples, one or more devices (e.g., base stations, AV management entities, other vehicles, RSUs, etc.) may receive a message indicating that a vehicle operating according to an AV mode is disengaging, or has disengaged, the AV mode. For example, wireless radios and associated antennas of a network node may receive an over-the-air message from a vehicle operating according to an AV mode, wherein the over-the-air message provides an indication of an instance of autonomous driving disengagement by the vehicle transmitting the message. A device receiving an autonomous disengagement message (e.g., a node of an autonomous driving network) may, according to some examples, alter one or more autonomous operation aspects in response to the over-the-air message. According to an example in which a network node receiving the autonomous disengagement message is a base station and/or an AV management entity, altering an autonomous operation aspect may, for example, comprise revising an AV decision engine (e.g., an AV mode rules engine providing a rules based engine for AV mode operation, an AV control driving engine implemented by vehicles when in autonomous driving operation, etc.) based at least in part on disengagement information associated with the over-the-air message. According to an example in which a network node receiving the autonomous disengagement message is another vehicle, altering an autonomous operation aspect may, for example, comprise modifying at least one AV control driving engine decision for the second vehicle.

Particular implementations of the subject matter described in this disclosure may be implemented to realize one or more of the following potential advantages or benefits. In some aspects, the present disclosure provides autonomous disengagement message techniques for enabling more fuel-efficient driving (e.g., by one or more vehicles of an autonomous driving network), greater vehicle density (e.g., more efficient road usage among a set of vehicles comprising an autonomous driving network), reduced or mitigated impact of human error (e.g., with respect to one or more vehicles of an autonomous driving network), etc. For example, AVs surrounding, nearby, adjacent, etc. a vehicle transmitting an autonomous disengagement message may modify and/or optimize AV control driving engine decisions in response to receiving the autonomous disengagement message. Additionally or alternatively, network nodes, such as base stations, AV management entities, and/or other nodes comprising the network cloud, receiving autonomous disengagement messages may obtain information (e.g., learning or gleaning one or more aspects of the disengagement conditions) enabling AV decision engine improvement and/or optimization.

As should be appreciated from the above, this disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.99999% reliability), ultra-low latency (e.g., ~ 1 millisecond (ms)), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
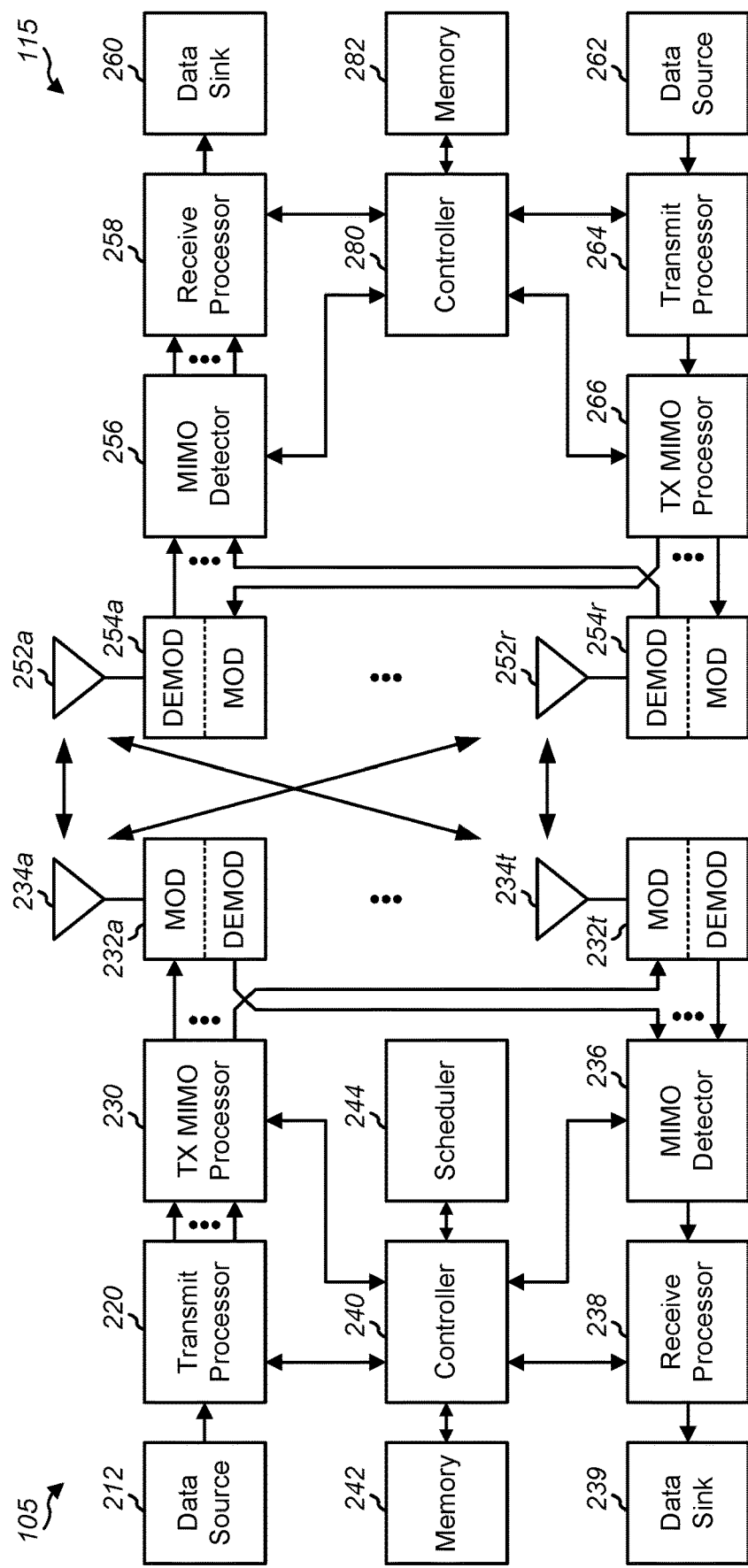
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 5 and 8, or other processes for the techniques described herein. Memories 242 and 282 may store data and program codes for base station 105 and UE 115, respectively. Scheduler 244 may schedule UEs for data transmission on the downlink or the uplink.

There has been considerable world-wide effort directed to the development of autonomous driving capabilities for vehicles (e.g., automotive and other transportation vehicles). Vehicles incorporating autonomous driving capabilities, often referred to as autonomous vehicles (AVs), employ sophisticated processor-based systems, sensors, and other advanced electronic technology, and thus may comprise an increasing number of the UEs (e.g., UEs 115$i$, 115$j$, 115$k$, etc.) of wireless network 100. Such AV capable UE configurations may, for example, receive data and control information on a downlink from a base station and/or may transmit data and control information on an uplink to the base station. Additionally or alternatively, AV capable UE configurations may transmit data on a sidelink (e.g., vehicle-to-vehicle (V2V) link between vehicles or vehicle-to-everything (V2X) link between the vehicle and another vehicle, roadside unit (RSU), etc.) to one or more UEs and/or may receive data on a sidelink from the one or more UEs.

AVs, when operating in AV mode providing autonomous driving functionality, are expected to enable operation with closer vehicle spacing and reduced reaction time. However, AV technology is still maturing, and current technology does not yet address all possible scenarios. In operation according to existing technologies, when an AV encounters a situation it is unable recognize, it cedes control to the human driver. Human drivers and AVs operate with different characteristics, which may include how closely a vehicle will approach another vehicle, how quickly a vehicle may react to a detected situation, etc. For example, under human control, a vehicle will likely be operated with more conservative vehicle spacing and greater reaction times will be experienced in detecting vehicles, objects and road features.

When an AV disengages its AV mode (e.g., autonomous driving disengagement to cede control to the human), the vehicle's driving characteristics may change. Aspects of the present disclosure provide for vehicle alerting (e.g., with respect to various devices comprising autonomous driving networks) to provide messages alerting other vehicles and/or network components to instances of autonomous driving disengagement. In accordance with some examples, other AVs (e.g., AVs surrounding, nearby, adjacent, etc. a vehicle transmitting an alert message indicating autonomous disengagement) are made aware of instances of autonomous driving disengagement and are enabled to incorporate this into their AV control driving engine, treating the vehicle experiencing the autonomous driving disengagement as a human-driven (e.g., non-AV) vehicle. According to some examples of the disclosure, reporting autonomous driving disengagements to a network (e.g., base station and/or other network elements comprising the network cloud) enables collection of various information (e.g., to determine if there are road features or hazards requiring intervention) and/or responsive action (e.g., to revise AV control driving engines). Vehicle alerting techniques of the present disclosure may thus operate to immediately (e.g., in real-time or near real-time) report an instance of autonomous driving disengagement to other vehicles and/or to other network components, such as to improve the overall AV driving environment (e.g., in scenarios with an appreciable fraction of AVs).

Aspects of the disclosure provides a set of over-the-air alert message constructs (e.g., a set of vehicle-originated alert messages indicating an autonomous driving disengagement event and/or a set of alert message transmission methodologies) to alert vehicles, network elements, etc. to an instance of autonomous driving disengagement. The alert messages of some examples may, for example, be sent to base stations, other vehicles, etc. over the cellular network (e.g., using a UE cellular interface, such as UMTS, 5G NR, etc. cellular interface, generally and collectively referred to herein as a Uu interface) and/or to other vehicles over a sidelink connection (e.g., using a UE to UE interface such as a PC5 interface). Alert messages of some examples may be sent as application-layer messages (e.g., sidelink application-layer messages via a PC5 interface, cellular application-layer messages via a Uu interface, etc.), control plane messages (e.g., sidelink control plane messages via PC5 control signaling (PC5-S), PC5 interface protocol PC5 radio resource control (PC5-RRC) message, etc., cellular control plane messages encoded in a control element, such as a media access control-control element (MAC CE), RRC message, etc.), or combinations thereof. According to some aspects of the disclosure, alert messages may singularly provide an alert to an autonomous driving disengagement, or may provide a robust alert augmented with information specific to the autonomous driving disengagement (e.g., including information with respect to location, disengagement cause, environment conditions, etc.).

Figure 3A:
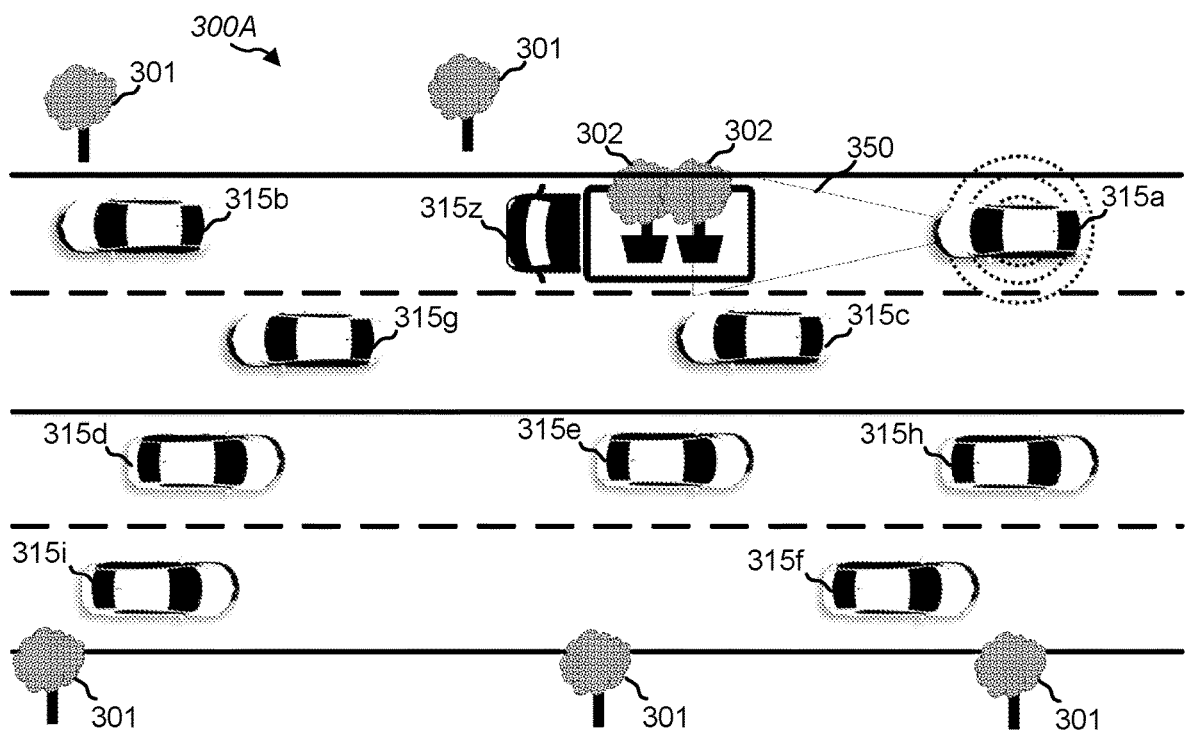
FIGS. 3A, 3B, 4A, and 4B illustrate various situations in which one or more alert messages indicating autonomous driving disengagement may be provided according to one or more aspects.
Figure 3B:
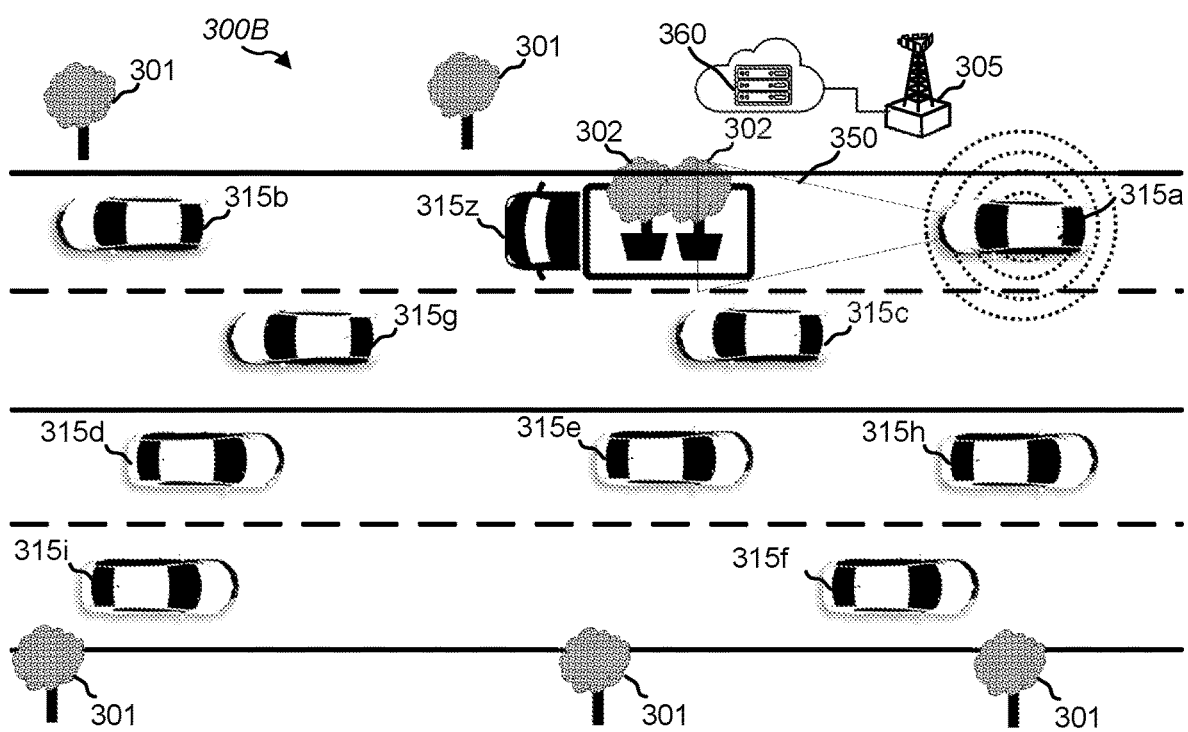
Figure 4A:
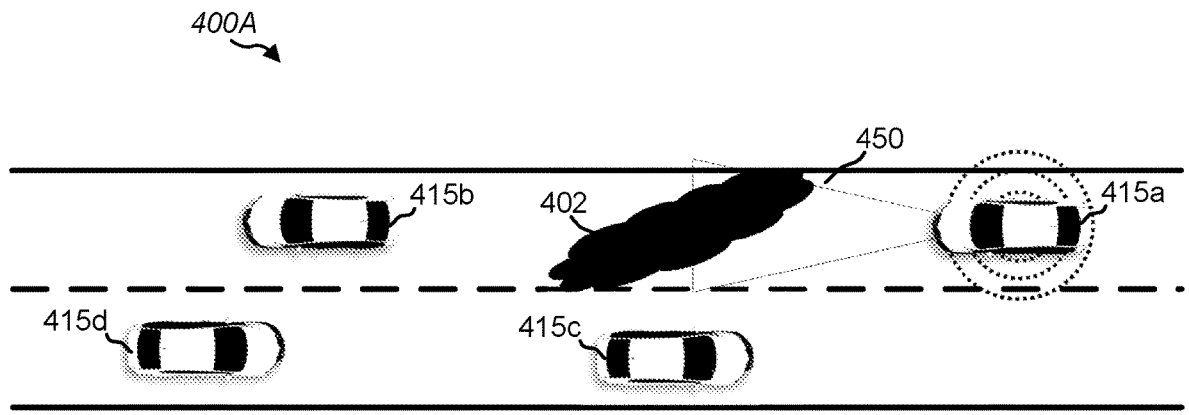
Figure 4B:
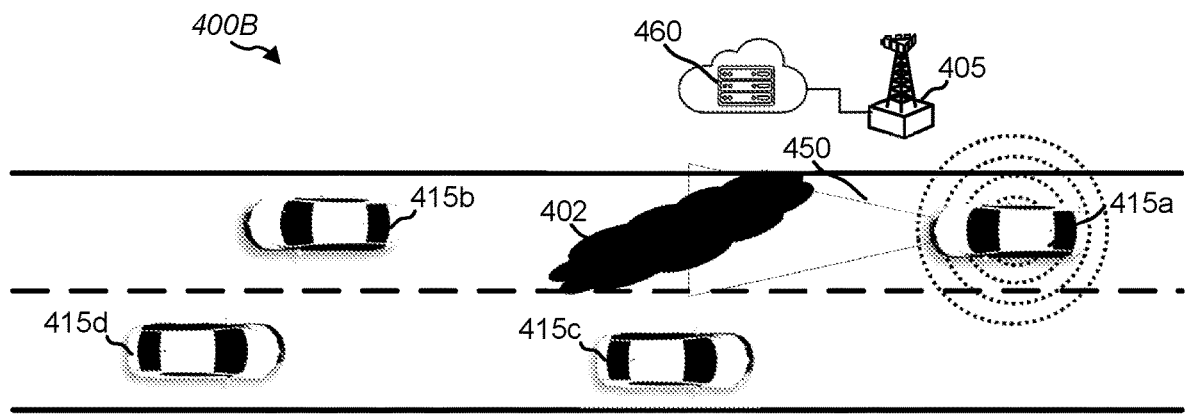

FIGS. 3A, 3B, 4A, and 4B illustrate various situations in which one or more alert messages indicating an autonomous driving disengagement event has been detected or otherwise identified may be provided according to examples of the present disclosure. In particular, FIGS. 3A and 3B illustrate situations in which UE 315$a$, comprising a vehicle operating according to an AV mode (e.g., an autonomous driving mode), may transmit an over-the-air message to one or more other nodes (e.g., some or all of UEs 315$b$-315$i$, and 315$z$, base station 305, etc.) in response to UE 315$a$ having detected an unrecognized or inappropriate object and ceding control to a human driver. Similarly, FIGS. 4A and 4B illustrate situations in which UE 415$a$, comprising a vehicle operating according to an AV mode (e.g., an autonomous driving mode), may transmit an over-the-air message to one or more other nodes (e.g., some or all of UEs 415$b$-415$d$, base station 405, etc.) in response to UE 415$a$ having detected a hazard and ceding control to a human driver.

UEs 315$a$-315$i$, 315$z$, and 415$a$-415$d$ of FIGS. 3A 3B, 4A, and 4B of examples herein may comprise various forms of vehicles (e.g., automotive and other transportation vehicles), such as UEs 115$i$-115$j$ of FIG. 1, having one or more wireless radios (e.g., wireless radios including various components and hardware, such as modulator and demodulators 254$a$-$r$, MIMO detector 256, receive processor 258, transmit processor 264, and TX MIMO processor 266 as illustrated in FIG. 2 for UE 115), such as for communication of data and control information between the vehicle and one or more base stations and/or communication of data between the vehicle and one or more other UE (e.g., various configurations of UEs, RSUs, etc.). Any or all of UEs 315$a$-315$i$, 315$z$, and 415$a$-415$d$ may comprise a vehicle configuration having AV capability. For example, various ones of UEs 315$a$-315$i$, 315$z$, and 415$a$-415$d$ may include AV logic having an AV control driving engine coupled to one or more sensors (e.g., camera, radar, sonar, lidar, thermal, microphone, global positioning system (AV logic having an AV control driving engine GPS), etc.) for monitoring and/or detecting aspects of the environment surrounding the UE, and coupled to one or more vehicle controllers and/or control systems (e.g., powertrain control module (PCM), engine control unit (ECU), transmission control unit (TCU), brake control unit (BCU), body control module (BCM), digital motor electronics (DME), etc.) for monitoring and/or controlling aspects of vehicle operation. The AV logic may include machine vision, machine learning, and/or artificial intelligence algorithms (collectively referred to herein as AI algorithms) configured for assisting in autonomous driving operation, such as by analyzing sensor output, analyzing vehicle operation, etc.

Base stations 305 and 405 of FIGS. 3B and 4B of examples herein may comprise various forms of network entities, such as base stations 105$a$-105$f$ of FIG. 1, providing communication coverage for a respective geographic area. Base stations 305 and 405 may, for example, include various components and hardware, such as modulator and demodulators 232*a-t*, MIMO detector 236, receive processor 238, transmit processor 220, and TX MIMO processor 230 as illustrated in FIG. 2 for base station 105, such as for communication of data and control information between the base station and one or more UEs and/or communication of data and control information between the base station and one or more other network entity (e.g., various base stations, mobility management entity (MME), access management function (AMF), session management function (SMF), authentication server function (AUSF), AV management entity, etc.). Base stations 305 and 405 of the illustrated embodiments are coupled to an AV management entity (e.g., AV management entities 360 and 460, respectively). AV management entities 360 and 460 may, for example, comprise nodes of the network cloud (e.g., processor-based systems having a controller operating under control of an instruction set providing AV logic to perform functions as described herein) operable to monitor and/or provide control with respect to various aspects of AV mode operation, such as within one or more respective autonomous driving networks. AV management entities of some examples may include AV logic having one or more aspects of AI logic (e.g., machine vision, machine learning, and/or artificial intelligence logic) configured to monitor and analyze AV mode operation and update, modify, optimize, etc. various aspects of autonomous operation and/or of an autonomous driving network (e.g., modify and/or optimize AV control driving engine decisions, such as implemented by AV control driving engines).

Although shown in the illustrated example as disposed in the network cloud separate from a respective one of base stations 305 and 405, AV management entities 360 and/or 460 of some examples of the disclosure may be provided in various other configurations. For example, an AV management entity, or some portion thereof, may be co-located or integrated with a base station according to aspects of the present disclosure.

Referring to the first example situation in which an unrecognized or inappropriate object is detected in FIG. 3A, network portion 300*a*, such as may comprise an area within wireless network 100 using various communication resources of the wireless network, represents a portion of a network (e.g., an autonomous driving network) in which one or more vehicles having AV capability may be operating according to an AV mode to implement autonomous driving functionality. UEs 315*a*-315*f* may, at least at some point in time, comprise vehicles implementing autonomous driving functionality. In contrast, UEs 315*g*-315*i* may comprise vehicles operating under human control (e.g., vehicles without AV capability, vehicles having AV mode disengaged, etc.) at the aforementioned point in time. UE 315*z* may comprise a form of transport vehicle (e.g., open-bed truck, lorry, etc.) configured for carrying various goods, such as may be operating according to an AV mode to implement autonomous driving functionality or may be operating under human control.

UE 315*a* implementing autonomous driving operation may proceed along a roadway within network portion 300*a* and come into proximity with UE 315*z*. According to some examples, sensor field of view 350 may encompass some or all of UE 315*z*. As an example, one or more forward facing sensors (e.g., camera, radar, sonar, lidar, thermal, etc.) may image or otherwise scan the area in front of UE 315*a* and detect UE 315*z* also proceeding along the roadway. AI algorithms of the AV logic implemented by UE 315*a* may, for example, be configured for identifying various objects, hazards, etc., and thus may identify UE 315*z* as another vehicle operating along the roadway and provide associated information (e.g., notification of a vehicle, vehicle type information, relative position information, relative velocity information, etc.) to an autonomous control driving engine of UE 315*a* for use in controlling one or more aspects of the autonomous driving operation.

In the autonomous driving situation illustrated in FIG. 3A, UE 315*z* is transporting shrubberies 302 which are visible to other vehicles operating within the network. Accordingly, in addition to or in the alternative to UE 315*z* being detected by the AV logic of UE 315*a*, shrubberies 302 transported by UE 315*z* of the example autonomous driving situation may be detected by UE 315*a*. The AI algorithms and the AV logic may be configured (e.g., trained or otherwise having an experience database enabling knowledge-based vehicle control) to detect and avoid shrubberies, trees, and other features (e.g., trees 301) commonly experienced alongside a roadway being traversed. However, detection of shrubberies 302 traveling within the boundaries of the roadway being traversed may present a paradox that the AI algorithms and the AV logic may not be configured to address, and thus knowledge-based vehicle control suitable for autonomous driving operation may not be possible.

In this situation, when UE 315*a* detects an object inconsistent with the environment (e.g., shrubberies in the back of a flatbed or similar truck), UE 315*a* may disengage autonomous driving operation (e.g., cede control to the human driver). In accordance with aspects of the disclosure, UE 315*a* issues (e.g., transmits) an alert message to one or more other vehicles (e.g., some or all of UEs 315*b*-315*f*) within network portion 300*a* (e.g., vehicles surrounding UE 315*a*, vehicles within a threshold distance from UE 315*a*, vehicles within the network of which UE 315*a* is aware, vehicles in communication with UE 315*a*, and/or the like). According to some examples, UE 315*a* may transmit an over-the-air alert message indicating autonomous driving disengagement to other vehicles of network portion 300*a* via a cellular vehicle to everything (CV2X) communication link (e.g., using a PC5 interface). The alert message of aspects of the disclosure provides an alert regarding autonomous driving disengagement by UE 315*a*. Additionally, the alert message may provide information specific to the autonomous driving disengagement, such as disengagement cause (e.g., hazard in the form of an object inconsistent with the environment), hazard description (e.g., a hazard description utilizing existing application-layer information element descriptors), environment conditions (e.g., road features, detected objects, etc.), location, etc. Vehicles receiving the alert message may alter one or more autonomous operation aspects in response to the alert message, such as to modify at least one autonomous control driving engine decision for the vehicle receiving the alert message.

Referring now to the second example situation in which an unrecognized or inappropriate object is detected in FIG. 3B, network portion 300*b*, which like network portion 300*a* above may comprise an area within wireless network 100 using various communication resources of the wireless network and providing portion of a network (e.g., an autonomous driving network) in which one or more vehicles having AV capability may be operating according to an AV mode to implement autonomous driving functionality, is shown. As described above, network portion 300*b* includes UEs 315*a*-315*f* (e.g., vehicles implementing autonomous driving functionality), UEs 315*g*-315*i* (e.g., vehicles operating under human control), and UE 315z (e.g., a form of transport vehicle configured for carrying various goods, which may be operating according to an AV mode to implement autonomous driving functionality or may be operating under human control). Network portion 300b of FIG. 3B further includes base station 305 (e.g., a base station and/or other network entity supporting communication for a number of UEs within a particular geographic area).

As described above, UE 315a implementing autonomous driving operation may proceed along a roadway within network portion 300b and come into proximity with UE 315z such that sensor field of view 350 may encompass some or all of UE 315z. In addition to or in the alternative to UE 315z being detected by the AV logic of UE 315a, shrubberies 302 transported by UE 315z of the example autonomous driving situation may be detected by UE 315a.

As with the previously described situation, when UE 315a detects an object inconsistent with the environment (e.g., shrubberies in the back of a flatbed or similar truck), UE 315a issues (e.g., transmit) an alert message regarding the autonomous driving disengagement according to aspects of the disclosure. For example, UE 315a may issue an alert message to one or more other vehicles (e.g., some or all of UEs 315b-315f) within network portion 300b, as described above. Additionally or alternatively, UE 315a may issue an alert message to one or more network entities according to some aspects of the disclosure. For example, UE 315a may transmit an over-the-air alert message indicating autonomous driving disengagement to base station 305 of network portion 300b via a cellular communication link (e.g., using a Uu interface). The alert message of aspects of the disclosure provides an alert regarding autonomous driving disengagement by UE 315a. Additionally, the alert message may provide information specific to the autonomous driving disengagement, such as disengagement cause (e.g., hazard), hazard description (e.g., a hazard description utilizing existing application-layer information element descriptors), environment conditions (e.g., road features, detected objects, etc.), location, etc. One or more network entities receiving the alert message may alter one or more autonomous operation aspects in response to the alert message, such as to update, modify, optimize, etc. various aspects of autonomous operation and/or of an autonomous driving network. According to some examples, the alert message, or some portion thereof, may be provided to AV logic of an AV management entity for facilitating modifying and/or optimizing AV control driving engine decisions (e.g., as implemented by AV control driving engines) based on information included in or associated with the alert message.

Referring to the first example situation in which a hazard is detected in FIG. 4A, network portion 400a, such as may comprise an area within wireless network 100 using various communication resources of the wireless network, represents a portion of a network (e.g., an autonomous driving network) in which one or more vehicles having AV capability may be operating according to an AV mode to implement autonomous driving functionality. UEs 415a-415c may, at least at some point in time, comprise vehicles implementing autonomous driving functionality. In contrast, UE 415d may comprise a vehicle operating under human control (e.g., a vehicle without AV capability, a vehicle having AV mode disengaged, etc.) at the aforementioned point in time.

UE 415a implementing autonomous driving operation may proceed along a roadway within network portion 400a and come into proximity with hazard 402, such as may comprise debris in the road, a significant irregularity in the surface of the roadway, an unknown visible anomaly, etc. According to some examples, sensor field of view 450 may encompass some or all of hazard 402. As an example, one or more forward facing sensors (e.g., camera, radar, sonar, lidar, thermal, etc.) may image or otherwise scan the area in front of UE 415a and detect hazard 402 appearing in a portion of the roadway being approached by UE 415a. AI algorithms of the AV logic implemented by UE 415a may, for example, be configured for identifying various objects, hazards, etc., and thus may identify hazard 402 as a hazard in the path of UE 415a and provide associated information (e.g., notification of a hazard, hazard type information, relative position information, etc.) to an autonomous control driving engine of UE 415a for use in controlling one or more aspects of the autonomous driving operation.

In this example situation, when UE 415a detects a hazard (e.g., a particular hazard identified by the AI algorithms, an object or other anomaly not otherwise recognizable to the AI algorithms, etc.), UE 415a may disengage autonomous driving operation (e.g., cede control to the human driver). In accordance with aspects of the disclosure, UE 415a issues (e.g., transmits) an alert message to one or more other vehicles (e.g., some or all of UEs 415b-415d) within network portion 400a (e.g., vehicles surrounding UE 415a, vehicles within a threshold distance from UE 415a, vehicles within the network of which UE 415a is aware, vehicles in communication with UE 415a, and/or the like). According to some examples, UE 415a may transmit an over-the-air alert message indicating autonomous driving disengagement to other vehicles of network portion 400a via a cellular vehicle to everything (CV2X) communication link (e.g., using a PC5 interface). The alert message of aspects of the disclosure provides an alert regarding autonomous driving disengagement by UE 415a. Additionally, the alert message may provide information specific to the autonomous driving disengagement, such as disengagement cause (e.g., hazard), hazard description (e.g., a hazard description utilizing existing application-layer information element descriptors), environment conditions (e.g., road features, detected objects, etc.), location, etc. Vehicles receiving the alert message may alter one or more autonomous operation aspects in response to the alert message, such as to modify at least one autonomous control driving engine decision for the vehicle receiving the alert message.

Referring now to the second example situation in which a hazard is detected in FIG. 4B, network portion 400b, which like network portion 400a above may comprise an area within wireless network 100 using various communication resources of the wireless network and providing portion of a network (e.g., an autonomous driving network) in which one or more vehicles having AV capability may be operating according to an AV mode to implement autonomous driving functionality, is shown. As described above, network portion 400b includes UEs 415a-415c (e.g., vehicles implementing autonomous driving functionality) and UE 415g-415d (e.g., a vehicle operating under human control). Network portion 400b of FIG. 4B further includes base station 405 (e.g., a base station and/or other network entity supporting communication for a number of UEs within a particular geographic area).

As described above, UE 415a implementing autonomous driving operation may proceed along a roadway within network portion 400b and come into proximity with hazard 402 such that sensor field of view 450 may encompass some or all of hazard 402. Hazard 402 of the example autonomous driving situation may be detected or otherwise identified as a hazard by AV logic of UE 415a.

As with the previously described situation, when UE 415*a* detects a hazard in the path of the vehicle, UE 415*a* issues (e.g., transmit) an alert message regarding the autonomous driving disengagement according to aspects of the disclosure. For example, UE 415*a* may issue an alert message to one or more other vehicles (e.g., some or all of UEs 415*b*-415*d*) within network portion 400*b*, as described above. Additionally or alternatively, UE 415*a* may issue an alert message to one or more network entities according to some aspects of the disclosure. For example, UE 415*a* may transmit an over-the-air alert message indicating autonomous driving disengagement to base station 405 of network portion 400*b* via a cellular communication link (e.g., using a Uu interface). The alert message of aspects of the disclosure provides an alert regarding autonomous driving disengagement by UE 415*a*. Additionally, the alert message may provide information specific to the autonomous driving disengagement, such as disengagement cause (e.g., hazard), hazard description (e.g., a hazard description utilizing existing application-layer information element descriptors), environment conditions (e.g., road features, detected objects, etc.), location, etc. One or more network entities receiving the alert message may alter one or more autonomous operation aspects in response to the alert message, such as to update, modify, optimize, etc. various aspects of autonomous operation and/or of an autonomous driving network. According to some examples, the alert message, or some portion thereof, may be provided to AV logic of an AV management entity for facilitating modifying and/or optimizing AV control driving engine decisions (e.g., as implemented by AV control driving engines) based on information included in or associated with the alert message.

Figure 5:
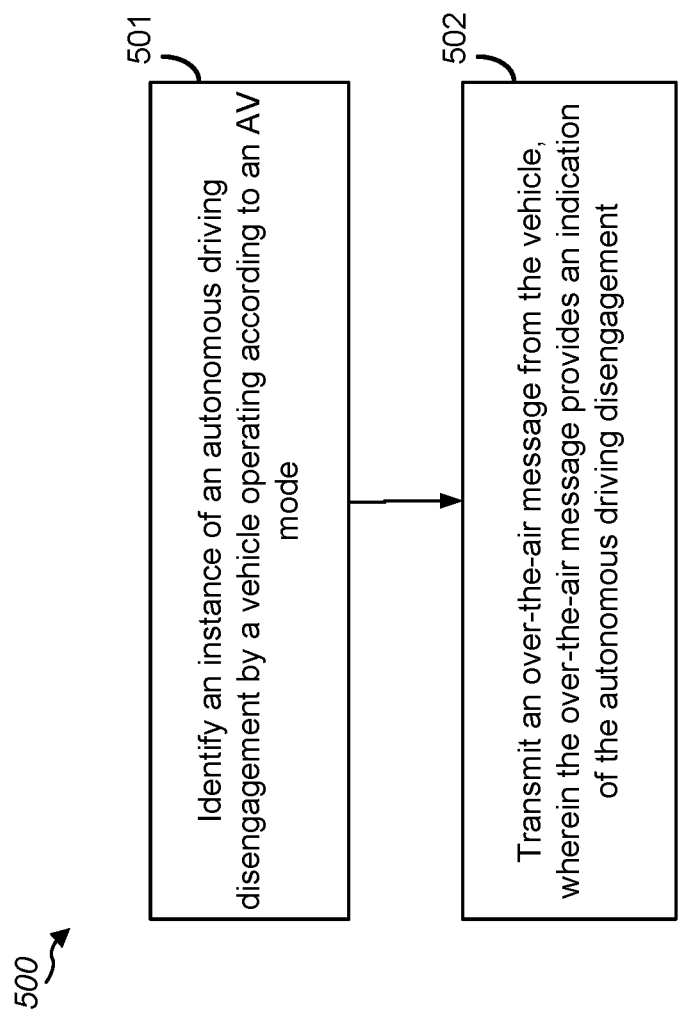
FIG. 5 is a flow diagram illustrating an example process that supports vehicle alerting according to one or more aspects.

FIG. 5 is a flow diagram illustrating example process 500 that provides for alert message transmission supporting vehicle alerting according to one or more aspects. Operations of process 500 may, for example, be performed by a UE, such as UEs 115 described above with reference to FIGS. 1 and 2, UE 315*a* described above with reference to FIGS. 3A and 3B, UE 415*a* described above with respect to FIGS. 4A and 4B, and/or UE 915 described below with reference to FIG. 9. For example, example operations (also referred to as "blocks") of process 500 may enable a UE to support vehicle alerting to provide messages alerting other vehicles and/or network components to instances of autonomous driving disengagement.

At block 501 of the illustrated example of process 500, an instance of autonomous driving disengagement by a vehicle operating according to an AV mode is identified. For example, a UE (e.g., UE 315*a*, UE 415*a*, etc.) comprising a vehicle implementing autonomous driving operation according to an AV mode may determine that autonomous driving is to be disengaged (e.g., to cede control to a human driver), thus identifying an instance of autonomous driving disengagement. In accordance with some examples, AV logic of the UE (e.g., computer instructions, such as in the form of software, firmware, etc., providing AV logic implemented by controller 280 operating to execute logic or computer instructions stored in memory 282) may monitor and/or analyze aspects of the autonomous driving operation and identify a situation in which autonomous driving disengagement is to be invoked (e.g., as described above with respect to FIGS. 3A, 3B, 4A, and 4B).

At block 502 of the example, an over-the-air message from the vehicle is transmitted. For example, in response to identifying an instance of autonomous driving disengagement, a UE (e.g., UE 315*a*, UE 415*a*, etc.) comprising a vehicle operating according to an AV mode (e.g., while implementing autonomous driving operation, when transitioning from autonomous driving operation, upon ceding control to a human driver, after ceding control to a human driver, etc.) may utilize one or more wireless radio resources (e.g., transmit processor 264, TX MIMO processor 266, MODs 254*a*-254*r*, and antennas 252*a*-252*r* operating under control of controller 280) for transmitting the over-the-air message.

According to aspects of the disclosure, the over-the-air message provides an indication of the autonomous driving disengagement. For example, an over-the-air message transmitted according to aspects of the disclosure may comprise an alert message configured to indicate an instance of autonomous driving disengagement. In addition to an indication of autonomous driving disengagement, an over-the-air message of some examples may include information specific to the autonomous driving disengagement (e.g., disengagement cause, hazard description, environment conditions, location, etc.).

Over-the-air messages providing some or all of the foregoing indication and/or information may be sent as application-layer messages (e.g., application-layer messages carried by PC5 sidelink, Uu cellular link, etc.). These over-the-air alert messages and/or the information elements therein may be standardized in application-layer standards, such as those defined by the Society of Automotive Engineers (SAE), the European standard for vehicular communication (ETSI-ITS), the Canadian Standard on Assurance Engagements (CSAE), 3GPP, etc. Additionally or alternatively, over-the-air messages providing some or all of the foregoing indication and/or information may be sent as control plane messages (e.g., control plane messages carried by PC5-S, MAC CE, etc.). Over-the-air messages and indications and/or information carried thereby may thus be sent as over-the-air messages/information elements according to some examples of the disclosure.

FIG. 6A shows application-layer alert message structure 600 providing an example application-layer configuration of an over-the-air message as may be utilized according to aspects of the disclosure. Over-the-air messages comprising an application-layer message configured according to application-layer alert message structure 600 may, for example, be transmitted by the UE (e.g., vehicle operating according to an AV mode implementing autonomous driving operation) according to some aspects of the disclosure using PC5 broadcast and/or PC5 groupcast (e.g., broadcast or groupcast application-layer message). Additionally or alternatively, over-the-air messages comprising an application-layer message configured according to application-layer alert message structure 600 may be transmitted via PC5 unicast (e.g., unicast application-layer message transmitted in the event a vehicle is actively engaged in a unicast session with another vehicle/RSU). For Uu transmission, the message elements of an over-the-air message configured according to application-layer alert message structure 600 may be sent over as application layer message according to some aspects. Application-layer messages utilized according to some examples of the disclosure may be standardized in application-layer standards, such as those defined by SAE, ETSI-ITS, CSAE, 3GPP, etc.

As described above, various information regarding the instance of autonomous driving disengagement may be optionally provided by an alert message transmitted as an over-the-air message, as represented by the fields of application-layer alert message structure 600 designated as "OPTIONAL". An over-the-air message of some examples, whether including optional informational elements or not, nevertheless provides an indication of the autonomous driving disengagement. For example, a header of application-layer alert message structure 600 may comprise various information (e.g., one or more of vehicle identification (ID), time stamp, etc.) according to a message structure defined to indicate an instance of autonomous driving disengagement.

Various of the message fields (e.g., the disengagement-Cause, disengageLocation, objCount, objects, and DisengageLocation of the example of application-layer alert message structure 600) may be used to provide information specific to the autonomous driving disengagement, such as may be utilized by AV logic of a vehicle, network element, etc. receiving the message. The information may be provided as descriptive data, indices/codes corresponding to data codebooks or lookup tables comprising descriptive data (e.g., to reduce the transmission size of an alert message), etc. Using the aforementioned indices or codes, information for a large data set of unique elements (e.g., on the order of hundreds or thousands of different data elements) may be carried by a message field having a relatively small allocated size (e.g., on the order of an octet or half-octet).

An example disengagementCause field may provide information regarding a root cause (e.g., detection of an unrecognized or inappropriate object, hazard, unexpected or anomalous circumstance, etc.) of the autonomous driving disengagement. Example disengagement codes as may be utilized in disengagementCause fields of some examples of application-layer alert message structure 600 are shown in FIG. 6B. It should be appreciated that the example codes and corresponding descriptive data of FIG. 6B presents only a small example and that many additional and/or alternative disengagement causes may be utilized. For example, the disengagement causes utilized may correspond to those defined by one or more standards or other predefined set (e.g., the approximately 350 disengagement causes provided for in the 2020 California AV disengagement reports).

Example objectCount and objects fields may provide information regarding one or more objects detected by the vehicle in association with the autonomous driving disengagement. An objectCount field, for example, may provide information regarding a number (e.g., DetectedObject-Count) of objects in association with the autonomous driving disengagement. An objects field may provide information identifying one or more objects (e.g., DetectedObject) detected in association with the autonomous driving disengagement. Example DetectedObject codes as may be utilized in object fields of some examples of application-layer alert message structure 600 are shown in FIG. 6C. The example DetectedObject codes of FIG. 6C may, for example, correspond to detected object descriptions of a SAE sensor sharing message definition for detected objects. Additional or alternative detected object descriptions (e.g., ETSI or CSAE definitions, a proprietary definition set, etc.) may be utilized according to some aspects of the disclosure.

Example disengagementLocation and DisengageLocation fields may provide information regarding a location of the vehicle detecting an autonomous driving disengagement event. A disengagementLocation field may, for example, provide information regarding a position at which the vehicle detected an autonomous driving disengagement event, a location of one or more objects detected by the vehicle in association with the autonomous driving disengagement event, etc. A DisengageLocation field may provide robust position information (e.g., Position3D) with respect to a disengagement location, such as to include height above terrain and/or other three-dimensional (3D) aspects.

It should be understood that the various message names and fields provided in the examples of FIG. 6A-6C are given as non-limiting examples to aid in understanding concepts of the present disclosure. Additional and/or alternative message names, fields, etc. may be utilized in accordance with aspects of the present disclosure.

Figure 7:
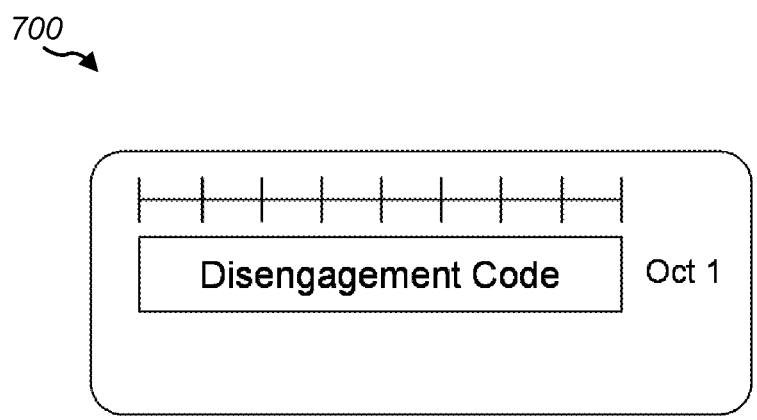
FIG. 7 is an example control plane alert message structure according to one or more aspects.

FIG. 7 shows control plane alert message structure 700 providing an example control plane configuration of an over-the-air message as may be utilized according to aspects of the disclosure. For example, in addition to or the alternative to transmission of alert messages or portions thereof via application-layer messages, a MAC CE, RRC, PC5-S, PC5-RRC, and/or other control plane message may be utilized in transmitting an alert message as an over-the-air message. These messages may include additional aspects related to the AV originating the message, such as identity, location, model and the like. Over-the-air messages comprising a control plane message configured according to control plane alert message structure 700 may, for example, be transmitted by the UE (e.g., vehicle operating according to an AV mode implementing autonomous driving operation) according to some aspects of the disclosure using PC5 broadcast and/or PC5 groupcast (e.g., control element of a broadcast or groupcast transmission). Additionally or alternatively, over-the-air messages comprising a control plane message configured according to control plane alert message structure 700 may be transmitted via PC5 unicast (e.g., control element of a unicast transmission in the event a vehicle is actively engaged in a unicast session with another vehicle/RSU). For Uu transmission, the message elements of an over-the-air message configured according to control plane alert message structure 700 may be sent over as control element (e.g., MAC CE, RRC, etc.) of a cellular transmission according to some aspects.

One or more control plane messages (e.g., MAC CE, RRC, PC5-S, PC5-RRC, etc.) may be defined to denote "autonomous driving disengagement" according aspects of the disclosure. For example, one or more disengagement codes may be defined as indicating autonomous driving disengagement when included as an element of a control plane transmission block (e.g., particular element within a transmission block). For example, a particular code (e.g., as may be carried in a predetermined control element or other control plane transmission block) may be used to indicate autonomous driving disengagement. According to some aspects of the disclosure, a set of disengagement codes may be defined so as not only indicate autonomous driving disengagement but to also provide information associated with the autonomous driving disengagement (e.g., disengagement cause, hazard description, environment conditions, location, etc.). For example, disengagement codes of a set of disengagement codes may index or otherwise correspond to data codebooks or lookup tables comprising descriptive data regarding autonomous driving disengagement. In accordance with some examples, disengagement codes having a size of an octet or half-octet may be utilized to provide information specific to the autonomous driving disengagement. Control plane alert message structure 700 of the illustrated example shows a disengagement code, such as may be carried as a MAC CE or other control plane element, having an allocated size of an octet.

Figure 8:
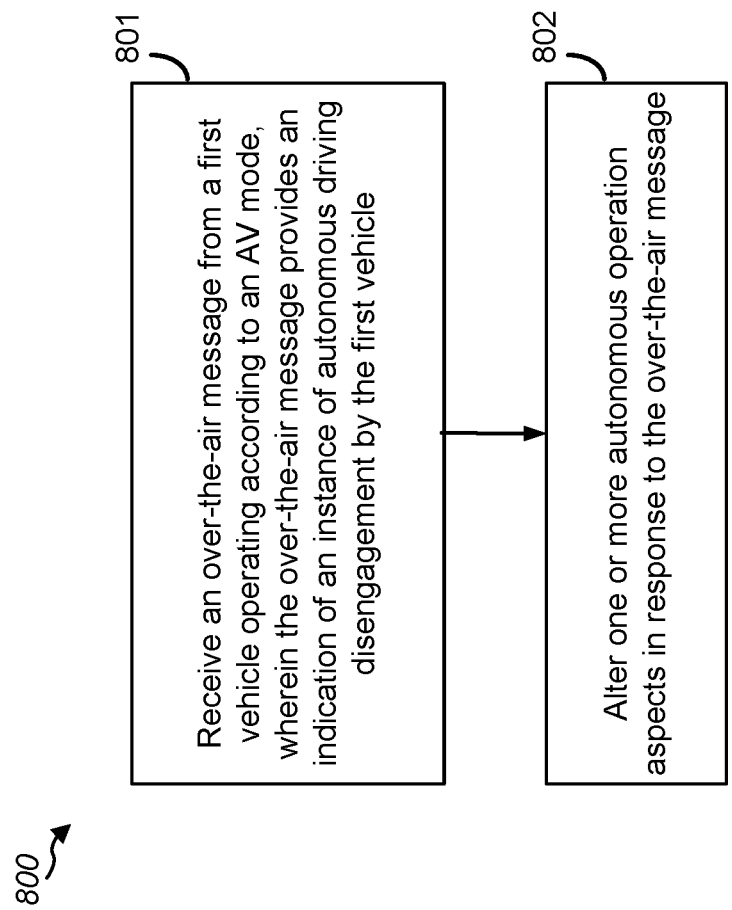
FIG. 8 is a flow diagram illustrating an example process that supports vehicle alerting according to one or more aspects.

FIG. 8 is a flow diagram illustrating example process 800 that provides for receiving alert messages supporting vehicle alerting according to one or more aspects. Operations of process 800 may be performed by various network nodes, such as UEs 115 described above with reference to FIGS. 1 and 2, UE 315*a* described above with reference to FIGS. 3A and 3B, UE 415*a* described above with respect to FIGS. 4A and 4B, and/or UE 915 described below with reference to FIG. 9, base stations 105 described above with reference to FIGS. 1 and 2, base station 305 described above with reference to FIG. 3B, base station 405 described above with respect to FIG. 4B, and/or base station 1005 described below with reference to FIG. 10, and/or AV management entity 360 described above with reference to FIG. 3B, AV management entity 460 described above with reference to FIG. 4B, and/or AV management entity 1160 described below with reference to FIG. 11. For example, example operations (also referred to as "blocks") of process 800 may enable one or more UEs, base stations, and/or AV management entities to support vehicle alerting to receive messages alerting vehicles and/or network components to instances of autonomous driving disengagement.

At block 801 of the illustrated example of process 800, an over-the-air message is received from a first vehicle operating according to an AV mode. For example, one or more UEs (e.g., any or all of UEs 315*b*-315*f*, UEs 415*b* and 415*d*, etc.) comprising vehicles implementing autonomous driving operation according to an AV mode may receive an over-the-air message from another vehicle implementing autonomous driving operation according to an AV mode. Additionally or alternatively, one or more UEs (e.g., any of all of UEs 315*g*-315*i*, UE 414*c*, etc.) comprising vehicles operating under human control or otherwise not operating according to an AV mode may receive an over-the-air message from a vehicle implementing autonomous driving operation according to an AV mode. A UE may, for example, utilize one or more wireless radio resources (e.g., antennas 252*a*-252*r*, DEMODs 254*a*-254*r*, MIMO detector 256, and receive processor 258 operating under control of controller 280) for receiving the over-the-air message. As another example, one or more base stations (e.g., base station 305, base station 405, etc.) providing communication coverage within a may receive an over-the-air message from a vehicle implementing autonomous driving operation according to an AV mode. A base station may, for example, utilize one or more wireless radio resources (e.g., antennas 234*a*-234*t*, DEMODs 232*a*-232*t*, MIMO detector 236, and receive processor 238 operating under control of controller 240) for receiving the over-the-air message. As yet another example, one or more AV management entities (e.g., AV management entity 360, AV management entity 460, etc., such as may be disposed in, coupled to, in communication with, or otherwise associated with an autonomous driving network) may receive an over-the-air message transmitted by a vehicle implementing autonomous driving operation according to an AV mode. An AV management entity may, for example, utilize a network interface (e.g., wireline or wireless communication circuitry operating under control of a processor-based controller) for receiving the over-the-air message either directly from the first vehicle or indirectly relayed via one or more network elements (e.g., a base station in communication with the first vehicle).

According to aspect of the disclosure, the over-the-air message provides an indication of an instance of autonomous driving disengagement by the first vehicle. Additionally, as described above, an over-the-air message of some examples may include information specific to the autonomous driving disengagement (e.g., disengagement cause, hazard description, environment conditions, location, etc.).

Over-the-air messages providing some or all of the foregoing indication and/or information may be received as application-layer messages (e.g., application-layer messages carried by PC5 sidelink, Uu cellular link, etc.). Additionally or alternatively, over-the-air messages providing some or all of the foregoing indication and/or information may be received as control plane messages (e.g., control plane messages carried by PC5-S, MAC CE, etc.). Over-the-air messages and indications and/or information carried thereby may thus be detected as over-the-air messages/information elements according to some examples of the disclosure.

At block 802 of the example, one or more autonomous operation aspects are altered in response to the over-the-air message. For example, network components (e.g., UEs, base stations, AV management entities, etc.) may proceed to alter one or more autonomous operation aspects (e.g., adjust autonomous driving operation, revise, update, change, etc. one or more parameters or rules of an AV decision engine, etc.), such as with respect to an autonomous driving network in which the first vehicle is operating, based upon receiving the over-the-air message. Additionally or alternatively, network components may utilize information carried in or otherwise associated with the over-the-air message to alter one or more autonomous operation aspects, such as with respect to an autonomous driving network in which the first vehicle is operating. For example, AV logic implemented by a network component may obtain and/or analyze information specific to the autonomous driving disengagement from or based upon the over-the-air message for determining one or more autonomous operation aspects to alter, how one or more autonomous operation aspects are to be altered, a period of time in which alterations to one or more autonomous operation aspects are to be implemented, identifying a network component which one or more autonomous operation aspects are to be altered with respect to, etc.

Where, for example, a UE (e.g., a second vehicle operating according to an AV mode implementing autonomous driving operation within a network in which the first vehicle is operating) receives the over-the-air message, altering an autonomous operation aspect may, according to some examples, comprise modifying at least one AV control driving engine decision for the UE (e.g., second vehicle). For example, AV logic of a second vehicle receiving the over-the-air message may modify one or more AV control driving engine decisions of an AV control driving engine utilized in an AV mode for implementing autonomous driving operation in response to receiving the over-the-air message. Altering the one or more AV control driving engine decisions may, for example, modify how closely the second vehicle will approach the first vehicle. Additionally or alternatively, altering the one or more AV control driving engine decisions may modify aspects of algorithms affected by how quickly another vehicle may react to a detected situation in response to receiving the over-the-air message.

Where a base station (e.g., a base station or other network entity providing communication coverage for a respective geographic area within a network in which the first vehicle is operating) receives the over-the-air message, altering an autonomous operation aspect may, according to some examples, comprise modifying at least one AV decision engine. For example, AV logic of a base station (e.g., a base station having AV management entity functionality co-located or integrated therewith) receiving the over-the-air message may modify one or more AV mode rules engines providing a rules based engine for AV mode operation in response to receiving the over-the-air message. Modifying an AV mode rules engine may, according to aspects of the disclosure, be used for learning-based modification and/or optimization of AV control driving engine decisions to be implemented by AV control driving engines (e.g., AV control driving engines deployed in one or more autonomous driving network). Additionally or alternatively, AV logic of a base station (e.g., a base station having AV management entity functionality co-located or integrated therewith) receiving the over-the-air message may modify one or more AV control driving engines implemented by vehicles when in autonomous driving operation in response to receiving the over-the-air message. Modifying an AV control driving engine may, according to some aspects of the disclosure, be used to modify how closely a vehicle will approach the first vehicle, modify aspects of algorithms affected by how quickly another vehicle may react to a detected situation in response to receiving the over-the-air message, etc., such as where resources of the vehicle subject to the modification are insufficient to or otherwise not practicably able to autonomously implement such modifications.

According to some examples in which an AV management entity is disposed in the network cloud separate from a base station or other network entity receiving an over-the-air message of aspects of the disclosure, the base station may relay or otherwise transmit the over-the-air message received from the first vehicle to the AV management entity. For example, a base station may utilize a network interface (e.g., wireline or wireless communication circuitry implementing a backhaul connection) for relaying the over-the-air message either directly or indirectly to the AV management entity.

Where an AV management entity (e.g., an AV management entity associated with a network in which the first vehicle is operating) receives the over-the-air message (e.g., receives the over-the-air message directly from the first vehicle or indirectly via another network entity), altering an autonomous operation aspect may, according to some examples, comprise modifying at least one AV decision engine. For example, AV logic of an AV management entity receiving the over-the-air message may modify one or more AV mode rules engines providing a rules based engine for AV mode operation in response to receiving the over-the-air message. Additionally or alternatively, AV logic of an AV management entity receiving the over-the-air message may modify one or more AV control driving engines implemented by vehicles when in autonomous driving operation in response to receiving the over-the-air message. Modifying an AV mode rules engine and/or one or more AV control driving engines by an AV management entity may, according to aspects of the disclosure, be as described above with respect to a base station altering an autonomous operation aspect.

Figure 9:
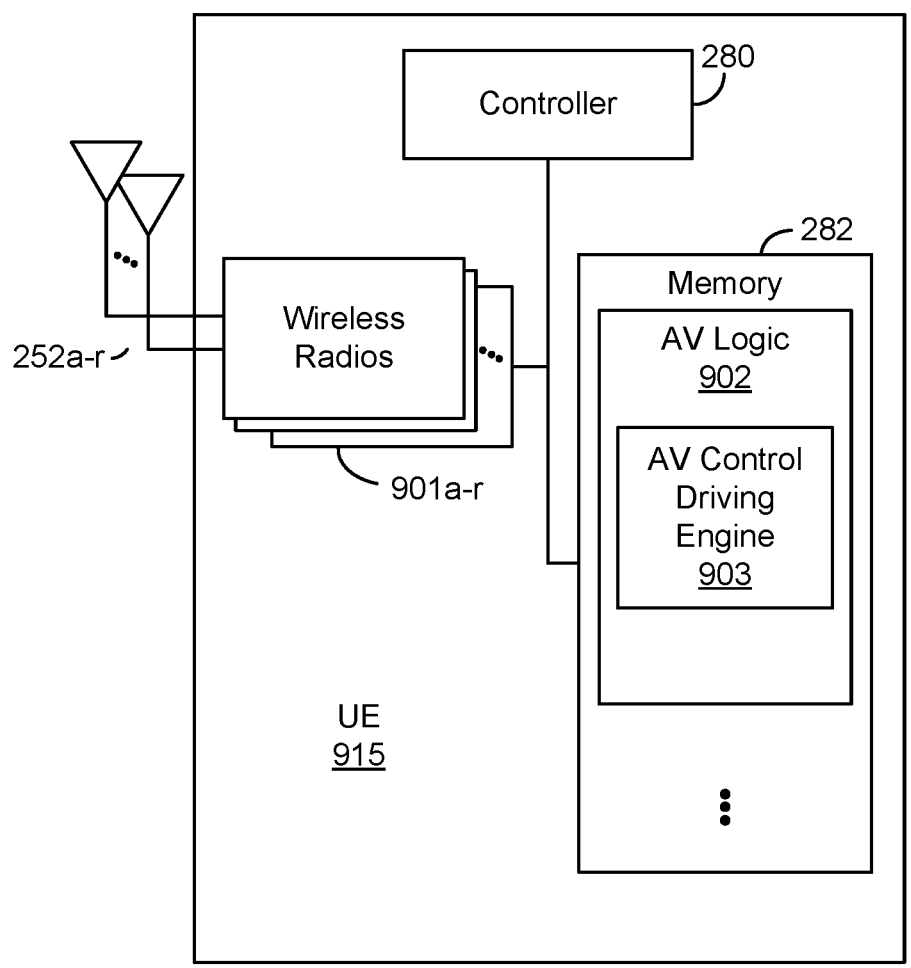
FIG. 9 is a block diagram of an example UE that supports vehicle alerting in according to one or more aspects.

FIG. 9 is a block diagram of example UE 915 that is configured for supporting vehicle alerting according to one or more aspects. The illustrated configuration of UE 915 may, according to some examples, be utilized in implementing UEs 315 of FIGS. 3A and 3B and UEs 415 of FIGS. 4A and 4B. UE 915 may, for example, perform operations, including the blocks of a process described with reference to FIGS. 5 and 8 above.

In some implementations, UE 915 includes the structure, hardware, and components shown and described with reference to UE 115 of FIGS. 1 and 2. For example, UE 915 includes controller 280, which operates to execute logic or computer instructions stored in memory 282, as well as controlling the components of UE 915 that provide the features and functionality of UE 915. UE 915, under control of controller 280, transmits and receives signals via wireless radios 901a-r and antennas 252a-r. Wireless radios 901a-r include various components and hardware, as illustrated in FIG. 2 for UE 115, including modulator and demodulators 254a-r, MIMO detector 256, receive processor 258, transmit processor 264, and TX MIMO processor 266.

As shown, memory 282 of UE 915 of the illustrated example includes AV logic 902. AV logic 902 of some examples includes computer instructions, such as in the form of software, firmware, etc., that may be executed by controller 280 to perform functions as described herein. Controller 280 executing AV logic 902 may, for example, implement autonomous driving operation according to an AV mode of the AV logic. In accordance with some examples, controller 280 executing AV logic 902 may monitor and/or analyze aspects of the autonomous driving operation, identify a situation in which autonomous driving disengagement is to be invoked, determine that autonomous driving is to be disengaged, etc. Controller 280 executing AV logic 902 may further control one or more of wireless radios 901a-r to transmit an over-the-air message providing an indication of the autonomous driving disengagement. Additionally or alternatively, controller 280 executing AV logic 902 may control one or more of wireless radios 901a-r to receive an over-the-air message from another vehicle implementing autonomous driving operation according to an AV mode. Controller 280 executing AV logic 902 may further alter one or more autonomous operation aspects in response to the over-the-air message.

Figure 10:
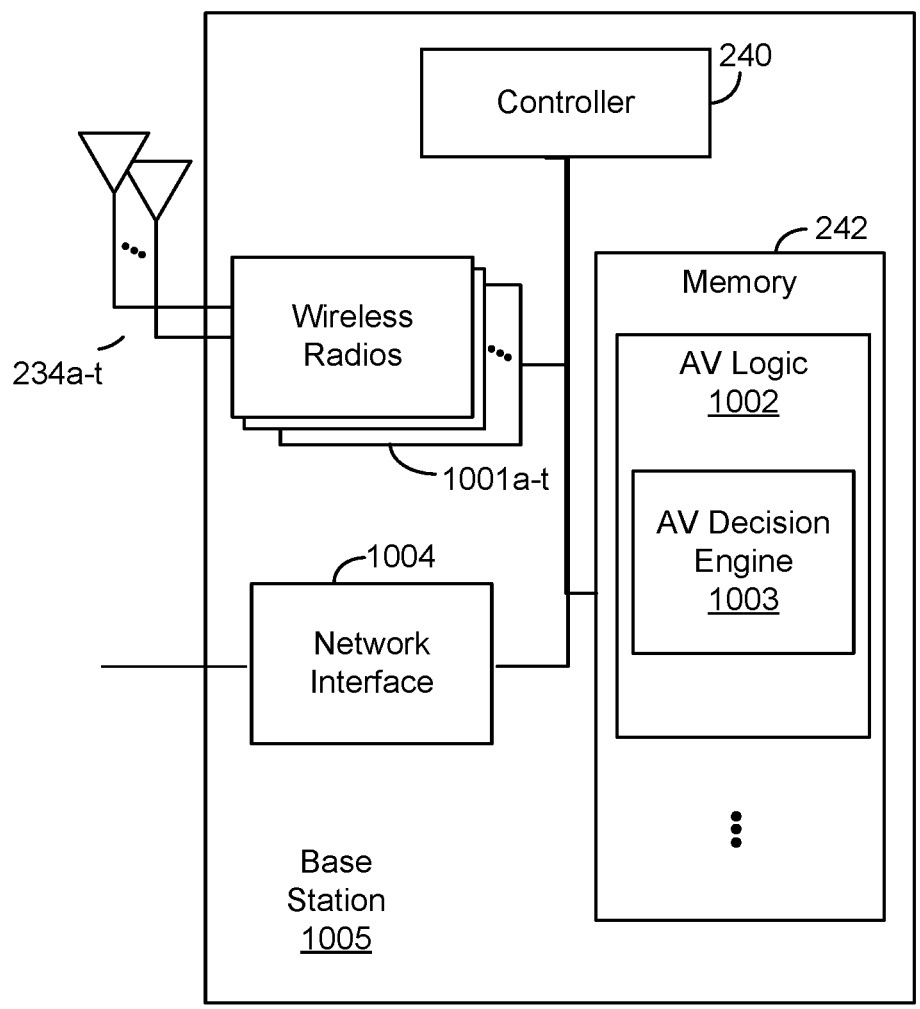
FIG. 10 is a block diagram of an example base station that supports vehicle alerting according to one or more aspects.

FIG. 10 is a block diagram of example base station 1005 that is configured for supporting vehicle alerting according to one or more aspects. The illustrated configuration of base station 1005 may, according to some examples, be utilized in implementing base station 305 of FIG. 3B, and base station 405 of FIG. 4B. Base station 1005 may, for example, perform operations including the blocks of a process described with reference to FIG. 8 above.

In some implementations, base station 1005 includes the structure, hardware, and components shown and described with reference to base station 105 of FIGS. 1 and 2. For example, base station 1005 includes controller 240, which operates to execute logic or computer instructions stored in memory 242, as well as controlling the components of base station 1005 that provide the features and functionality of base station 1005. Base station 1005, under control of controller 240, transmits and receives signals via wireless radios 1001a-t and antennas 234a-t. Wireless radios 1001a-t include various components and hardware, as illustrated in FIG. 2 for base station 105, including modulator and demodulators 232a-t, transmit processor 220, TX MIMO processor 230, MIMO detector 236, and receive processor 238. Base station 1005 of the illustrated example also includes network interface 1004. Network interface 1004 of some examples may comprise wireline (e.g., cellular core network wireline backhaul interface, network interface card (NIC), fiber optic network interface, etc.) or wireless (e.g., cellular core network wireless backhaul interface, wireless radio, etc.) communication circuitry operating under control of controller 240.

As shown, memory 242 of base station 1005 of the illustrated example includes AV logic 1002. AV logic 1002 of some examples includes computer instructions, such as in the form of software, firmware, etc. that may be executed by controller 240 to perform functions as described herein. Controller 240 executing AV logic 1002 may, for example, control one or more of wireless radios 1001a-t to receive an over-the-air message from a vehicle implementing autonomous driving operation according to an AV mode. Controller 240 executing AV logic 1002 may further alter one or more autonomous operation aspects in response to the over-the-air message. Additionally or alternatively, controller 240 executing AV logic 1002 may relay a received over-the-air message, such as via one or more of wireless radios 1001*a-t* or network interface 1004, to an AV management entity.

Figure 11:
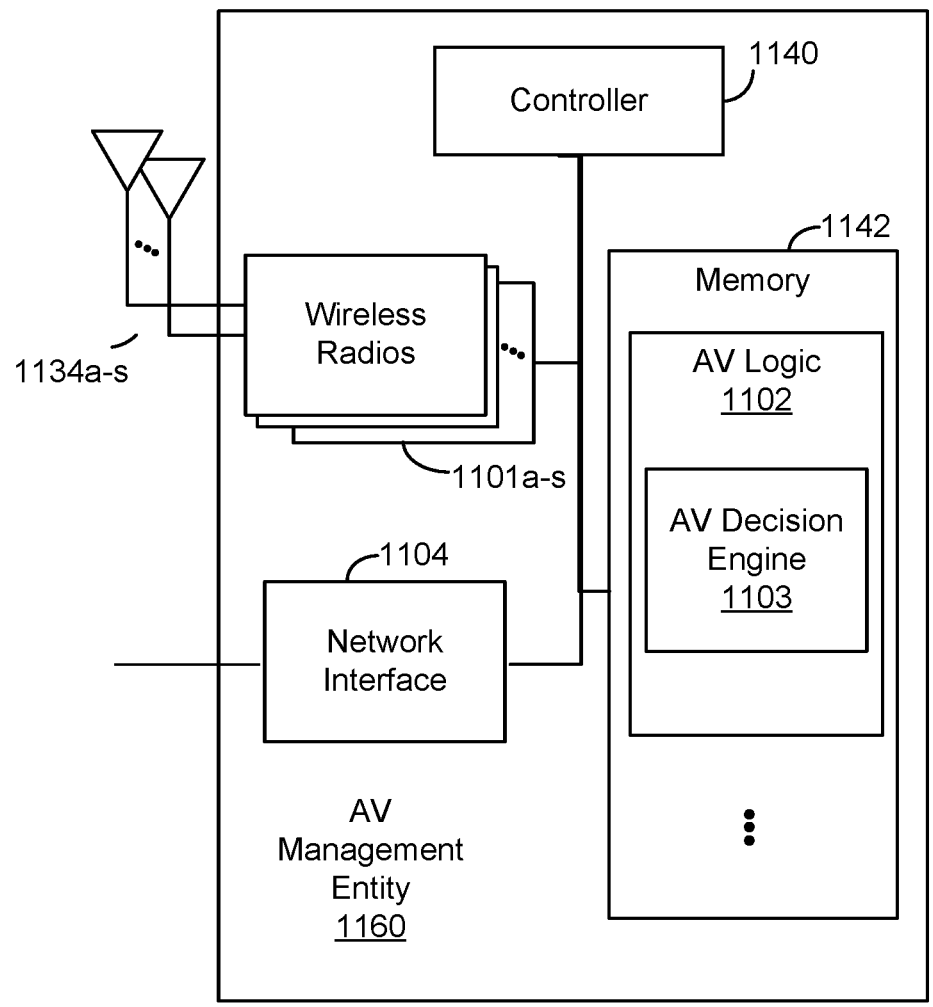
FIG. 11 is a block diagram of an autonomous vehicle (AV) management entity that supports vehicle alerting according to one or more aspects.

FIG. 11 is a block diagram of example AV management entity 1160 that is configured for supporting vehicle alerting according to one or more aspects. The illustrated configuration of AV management entity 1160 may, according to some examples, be utilized in implementing AV management entity 360 of FIG. 3B and AV management entity 460 of FIG. 4B. AV management entity 1160 may, for example, perform operations including the blocks of a process described with reference to FIG. 8 above.

In some implementations, AV management entity 1160 includes structure, hardware, and components similar to that shown and described with reference to base station 105 of FIGS. 1 and 2. For example, AV management entity 1160 includes controller 1140, which operates to execute logic or computer instructions stored in memory 1142, as well as controlling the components of AV management entity 1160 that provide the features and functionality of AV management entity 1160. AV management entity 1160, under control of controller 1140 may transmit and receive signals via wireless radios 1101*a-s* and antennas 1134*a-s*. Wireless radios 1101*a-s* may include various components and hardware, as illustrated in FIG. 2 for base station 105, including modulator and demodulators, a transmit processor, a TX MIMO processor, a MIMO detector, and a receive processor. AV management entity 1160 of the illustrated example also includes network interface 1104. Network interface 1104 of some examples may comprise wireline (e.g., cellular core network wireline backhaul interface, network interface card (NIC), fiber optic network interface, etc.) or wireless (e.g., cellular core network wireless backhaul interface, wireless radio, etc.) communication circuitry operating under control of controller 1140.

As shown, memory 1142 of AV management entity 1160 of the illustrated example includes AV logic 1102. AV logic 1102 of some examples includes computer instructions, such as in the form of software, firmware, etc. that may be executed by controller 1140 to perform functions as described herein. Controller 1140 executing AV logic 1102 may, for example, control one or more of wireless radios 1101*a-s* to receive an over-the-air message from a vehicle implementing autonomous driving operation according to an AV mode or from a base station relaying an over-the-air message from a vehicle implementing autonomous driving operation according to an AV mode. Controller 1140 executing AV logic 1102 may further alter one or more autonomous operation aspects in response to the over-the-air message.

It is noted that one or more blocks (or operations) described with reference to FIGS. 5 and 8 may be combined with one or more blocks (or operations) described with reference to another of the figures. For example, one or more blocks (or operations) of FIG. 5 may be combined with one or more blocks (or operations) of FIG. 9. As another example, one or more blocks associated with FIG. 8 may be combined with one or more blocks associated with FIG. 10. As another example, one or more blocks associated with FIG. 8 may be combined with one or more blocks (or operations) associated with FIG. 11. Additionally, or alternatively, one or more operations described above with reference to FIGS. 1 and 2 may be combined with one or more operations described with reference to FIG. 9, 10, or 11.

In some examples of methods, the apparatuses, and articles including non-transitory computer-readable medium described herein, various aspects of vehicle alerting may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for identifying an instance of an autonomous driving disengagement by a vehicle operating according to an AV mode, and transmitting an over-the-air message from the vehicle, wherein the over-the-air message provides an indication of the autonomous driving disengagement.

2. The methods, apparatuses, and articles of clause 1, may further provide for selecting a form of the over-the-air message from a set of supported forms of over-the-air messages.

3. The methods, apparatuses, and articles of clause 2, wherein the set of supported forms of over-the-air messages includes an application-layer message form and a control plane message form.

4. The methods, apparatuses, and articles of any of clauses 1-3, wherein the over-the-air message comprises a sidelink application-layer message including the indication of the autonomous driving disengagement.

5. The methods, apparatuses, and articles of clause 4, wherein the sidelink application-layer message is broadcast or groupcast.

6. The methods, apparatuses, and articles of clause 4, wherein the sidelink application-layer message is unicast.

7. The methods, apparatuses, and articles of any of clauses 1-6, wherein the over-the-air message comprises a PC5 interface protocol PC5-Signaling message.

8. The methods, apparatuses, and articles of any of clauses 1-7, wherein the over-the-air message comprises a PC5 interface protocol PC5-RRC message.

9. The methods, apparatuses, and articles of any of clauses 1-8, wherein the over-the-air message comprises a cellular network application-layer data message.

10. The methods, apparatuses, and articles of any of clauses 1-9, wherein the over-the-air message comprises a MAC CE including the indication of the autonomous driving disengagement.

11. The methods, apparatuses, and articles of any of clauses 1-10, wherein the over-the-air message includes information identifying the vehicle, location information for the vehicle, and a time stamp.

12. The methods, apparatuses, and articles of any of clauses 1-11, wherein the over-the-air message includes at least one of disengagement cause information, disengagement location information, detected object information, or environmental condition information.

13. Methods, apparatuses, and articles for wireless communication may provide for receiving an over-the-air message from a first vehicle operating according to an AV mode, wherein the over-the-air message provides an indication of an instance of autonomous driving disengagement by the first vehicle, and altering one or more autonomous operation aspects in response to the over-the-air message.

14. The methods, apparatuses, and articles of clause 13, wherein the over-the-air message is received by a second vehicle operating according to the AV mode in proximity to the first vehicle.

15. The methods, apparatuses, and articles of clause 14, wherein altering the one or more autonomous operation aspects may provide for modifying at least one autonomous control driving engine decision for the second vehicle.

16. The methods, apparatuses, and articles of any of clauses 13-15, wherein the over-the-air message is received by a network element of a cellular network in which the first vehicle is operating.

17. The methods, apparatuses, and articles of clause 16, wherein altering the one or more autonomous operation aspects may provide for revising an autonomous vehicle decision engine based at least in part on disengagement information associated with the over-the-air message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-4 and 9-11 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
   identifying an instance of an autonomous driving disengagement by a vehicle operating according to an autonomous vehicle (AV) mode; and
   transmitting an over-the-air message from the vehicle to another vehicle, wherein the over-the-air message provides an indication of the autonomous driving disengagement configured according to an application-layer message form or a control plane message form.

2. The method of claim 1, further comprising:
   selecting a form of the over-the-air message from a set of supported forms of over-the-air messages.

3. The method of claim 2, wherein the set of supported forms of over-the-air messages includes the application-layer message form and the control plane message form.

4. The method of claim 1, wherein the over-the-air message comprises a sidelink application-layer message including the indication of the autonomous driving disengagement.

5. The method of claim 4, wherein the sidelink application-layer message is broadcast or groupcast.

6. The method of claim 4, wherein the sidelink application-layer message is unicast.

7. The method of claim 1, wherein the over-the-air message comprises a PC5 interface protocol PC5-Signaling message.

8. The method of claim 1, wherein the over-the-air message comprises a PC5 interface protocol PC5-RRC (radio resource control) message.

9. The method of claim 1, wherein the over-the-air message comprises a cellular network application-layer data message.

10. The method of claim 1, wherein the over-the-air message comprises a media access control (MAC) control element (CE) including the indication of the autonomous driving disengagement.

11. The method of claim 1, wherein the over-the-air message includes information identifying the vehicle, location information for the vehicle, and a time stamp.

12. The method of claim 1, wherein the over-the-air message includes at least one of disengagement cause information, disengagement location information, detected object information, or environmental condition information.

13. An apparatus configured for wireless communication, the apparatus comprising:
   at least one memory storing processor-readable code; and
   at least one processor coupled to the at least one memory, the at least one processor configured to execute the processor-readable code to cause the apparatus to:
      identify an instance of an autonomous driving disengagement by a vehicle operating according to an autonomous vehicle (AV) mode; and
      transmit an over-the-air message from the vehicle to another vehicle, wherein the over-the-air message provides an indication of the autonomous driving disengagement configured according to an application-layer message form or a control plane message form.

14. The apparatus of claim 13, wherein the processor-readable code further causes the apparatus to:
 select a form of the over-the-air message from a set of supported forms of over-the-air messages.

15. The apparatus of claim 14, wherein the set of supported forms of over-the-air messages includes the application-layer message form and the control plane message form.

16. The apparatus of claim 13, wherein the over-the-air message comprises a sidelink application-layer message including the indication of the autonomous driving disengagement.

17. The apparatus of claim 13, wherein the over-the-air message comprises a PC5 interface protocol PC5-Signaling message.

18. The apparatus of claim 13, wherein the over-the-air message comprises a PC5 interface protocol PC5-RRC (radio resource control) message.

19. The apparatus of claim 13, wherein the over-the-air message comprises a cellular network application-layer data message.

20. The apparatus of claim 13, wherein the over-the-air message comprises a media access control (MAC) control element (CE) including the indication of the autonomous driving disengagement.

21. The apparatus of claim 13, wherein the over-the-air message includes information identifying the vehicle, location information for the vehicle, and a time stamp.

22. The apparatus of claim 13, wherein the over-the-air message includes at least one of disengagement cause information, disengagement location information, detected object information, or environmental condition information.

23. A method of wireless communication, the method comprising: receiving an over-the-air message from a first vehicle operating according to an autonomous vehicle (AV) mode, wherein the over-the-air message provides an indication of an instance of autonomous driving disengagement by the first vehicle, and wherein the indication is configured according to an application-layer message form or a control plane message form; and
 altering one or more autonomous operation aspects of a second vehicle in response to the over-the-air message.

24. The method of claim 23, wherein the over-the-air message is received by the second vehicle operating according to the AV mode in proximity to the first vehicle.

25. The method of claim 24, wherein altering the one or more autonomous operation aspects comprises:
 modifying at least one autonomous control driving engine decision for the second vehicle.

26. The method of claim 23, wherein the over-the-air message is received by a network element of a cellular network in which the first vehicle is operating.

27. The method of claim 26, wherein altering the one or more autonomous operation aspects comprises:
 revising an autonomous vehicle decision engine based at least in part on disengagement information associated with the over-the-air message.

28. An apparatus configured for wireless communication, the apparatus comprising:
 at least one memory storing processor-readable code; and
 at least one processor coupled to the at least one memory, the at least one processor configured to execute the processor-readable code to cause the apparatus to:
  receive an over-the-air message from a first vehicle operating according to an autonomous vehicle (AV) mode, wherein the over-the-air message provides an indication of an instance of autonomous driving disengagement by the first vehicle, and wherein the indication is configured according to an application-layer message form or a control plane message form; and
  alter one or more autonomous operation aspects of a second vehicle in response to the over-the-air message.

29. The apparatus of claim 28, wherein the over-the-air message is received by the second vehicle operating according to the AV mode in proximity to the first vehicle, and wherein the processor-readable code causing the at least one processor to alter the one or more autonomous operation aspects causes the apparatus to:
 modify at least one autonomous control driving engine decision for the second vehicle.

30. The apparatus of claim 28, wherein the over-the-air message is received by a network element of a cellular network in which the first vehicle is operating, and wherein the processor-readable code causing the at least one processor to alter the one or more autonomous operation aspects causes the apparatus to:
 revise an autonomous vehicle decision engine based at least in part on disengagement information associated with the over-the-air message.

\* \* \* \* \*